United States Patent [19]
Nakasuji

[11] Patent Number: 5,823,341
[45] Date of Patent: Oct. 20, 1998

[54] VIDEO TAPE STORAGE CASE WITH LOCK

[76] Inventor: Tamotsu Nakasuji, 1-19-28 Imagome, Higashiosaka, Osaka, Japan

[21] Appl. No.: 742,203

[22] Filed: Oct. 31, 1996

[51] Int. Cl.$^6$ .................................................. B65D 85/575
[52] U.S. Cl. ....................... 206/387.11; 206/1.5; 206/807
[58] Field of Search ................................. 70/63; 206/1.5, 206/308.2, 387.11, 807

[56] References Cited

U.S. PATENT DOCUMENTS

| | | | |
|---|---|---|---|
| 3,495,716 | 2/1970 | Gregory | 206/387.11 |
| 4,293,266 | 10/1981 | St. Lawrence et al. | 206/387.11 |
| 5,205,401 | 4/1993 | Weisburn et al. | 206/387.11 |
| 5,375,712 | 12/1994 | Weisburn | 206/387.11 |
| 5,390,515 | 2/1995 | Essick | 206/1.5 |
| 5,417,319 | 5/1995 | Chalberg et al. | 206/387.11 |
| 5,517,178 | 5/1996 | Rodrigues | 206/387.11 |
| 5,636,535 | 6/1997 | Shimada | 206/387.11 |

*Primary Examiner*—Jimmy G. Foster
*Attorney, Agent, or Firm*—Merchant, Gould, Smith, Edell, Welter & Schmidt, P.A.

[57] ABSTRACT

The present disclosure relates to a video tape case with lock is used to prevent shoplifting of video tapes. A case body is composed of a receiving body and a lid part. The receiving body and the lid part are connected flexibly. A lock part is an independent component of this video tape storage case. There are penetration holes on the receiving body and on the lid part respectively. The penetration holes overlap when they are closed together. Holding claws are disposed within the penetration holes. The lock part is structured with an abutting wall and a flexible holding part attached to a stud. When the case body is closed, the holding claw and the holding part are fastened by inserting the prop into the overlapped penetration holes until the abutting wall touches to the out side of the lid part. The case body is unable to open when the lock is attached to the case body. In other words, when the abutting wall touches the out side of the lid part and the holding claw and the holding part are fastened, the video tape storage case cannot be open. Unless a detach key is inserted into the penetration hole on the receiving body and changes the shape of the holding part to release the holding part and the holding claw, the case body cannot be open.

18 Claims, 10 Drawing Sheets

VIDEO TAPE STORAGE CASE WITH LOCK

FIELD OF INVENTION

This invention relates to video tape storage cases used by video rental stores.

BACKGROUND—DESCRIPTION OF PRIOR ART

Some video rental stores keep video tapes in storage cases. Each case is further put into an outer case with a title and a picture for display. When someone attempts to take the enclosed video without checking it out, an electronic article surveillance system is activated and notifies store employees. Therefore, a customer must bring the storage case with the video tape to the counter and pay first. Then, the store clerk hands the video tape to the customer after the customer passes the security system. However, because anyone could open a storage case, there is a high risk that the tape could be removed from the box. Moreover, the theft proof sensor tag could be removed when employees are not watching.

Accordingly, an object of the present invention is to provide a case with a lock mechanism which will prevent people other than the clerk from removing the video tape from the case.

SUMMARY OF THE INVENTION

The present invention relates to a video tape storage case which prevents people other than the clerk from removing the video tape from the case. This video tape storage case includes a case body structured with flexibly attached left and right storage parts. Besides the case body, a lock is needed. Both the left and right storage parts have matching holes when they are closed together. Close to the left storage part's hole there is a holding claw. The lock is structured with an abutting wall and a flexible holding part attached to a stud. When the case body is closed, the holding claw and the holding part will be fastened by inserting the stud through the matching holes. In a such a configuration, the case body is unable to be opened. Inserting a detach key into the hole on the left storage part changes the holding part shape and releases the holding part and the holding claw.

DETAILED DESCRIPTION

Constitution of the case body

Figure 1:
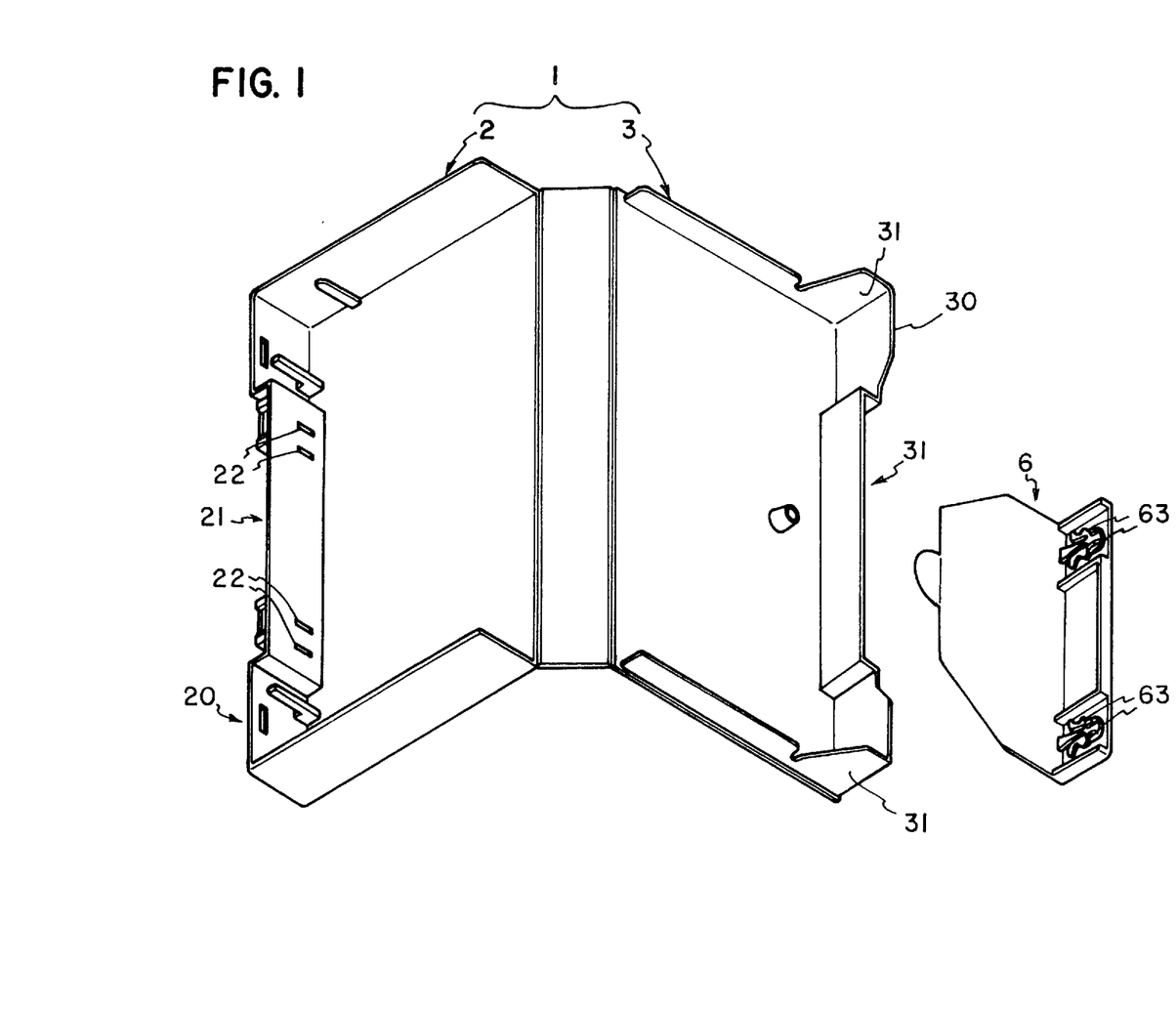
FIG. 1 is a perspective view of the video tape storage case opened from a bottom angle.

FIG. 1 shows a video tape storage case structured with a case body 1 and a lock 6. When the lock 6 is applied to the closed case body 1, the case body cannot be opened.

Figure 2:
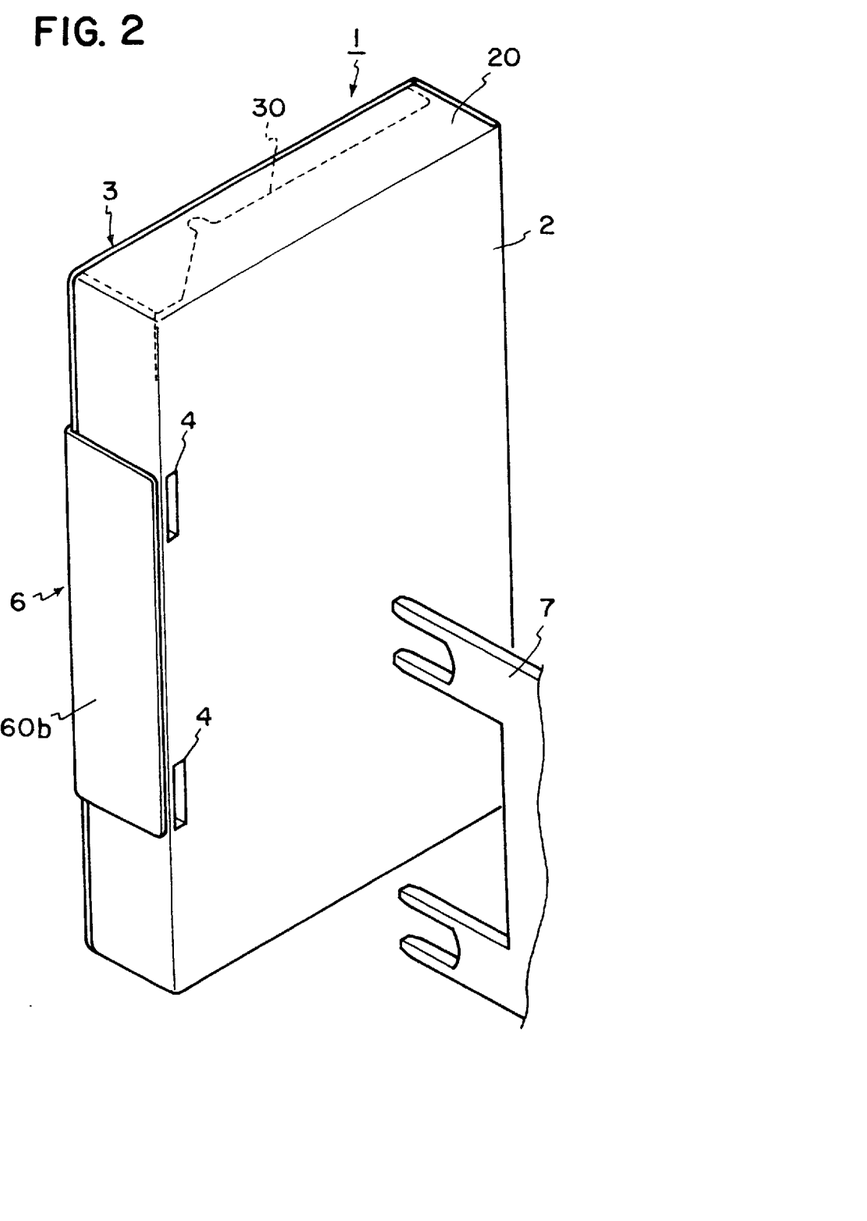
FIG. 2 is a perspective view of the video tape storage case with the lock and the detach key.

Referring to FIG. 2, a detach key 7 can detach the lock 6 from the case body 1 to allow the case body 1 to be opened. The case body 1 and the lock 6 are made of flexible synthetic resin.

As shown in FIG. 1, the case body 1 is structured with a flexibly attached receiving body 2 and a lid part 3.

Referring back to FIG. 2, when the case is closed, an upright wall 30 of the lid part 3 goes inside of an upright wall 20 of the receiving body 2.

Figure 3:
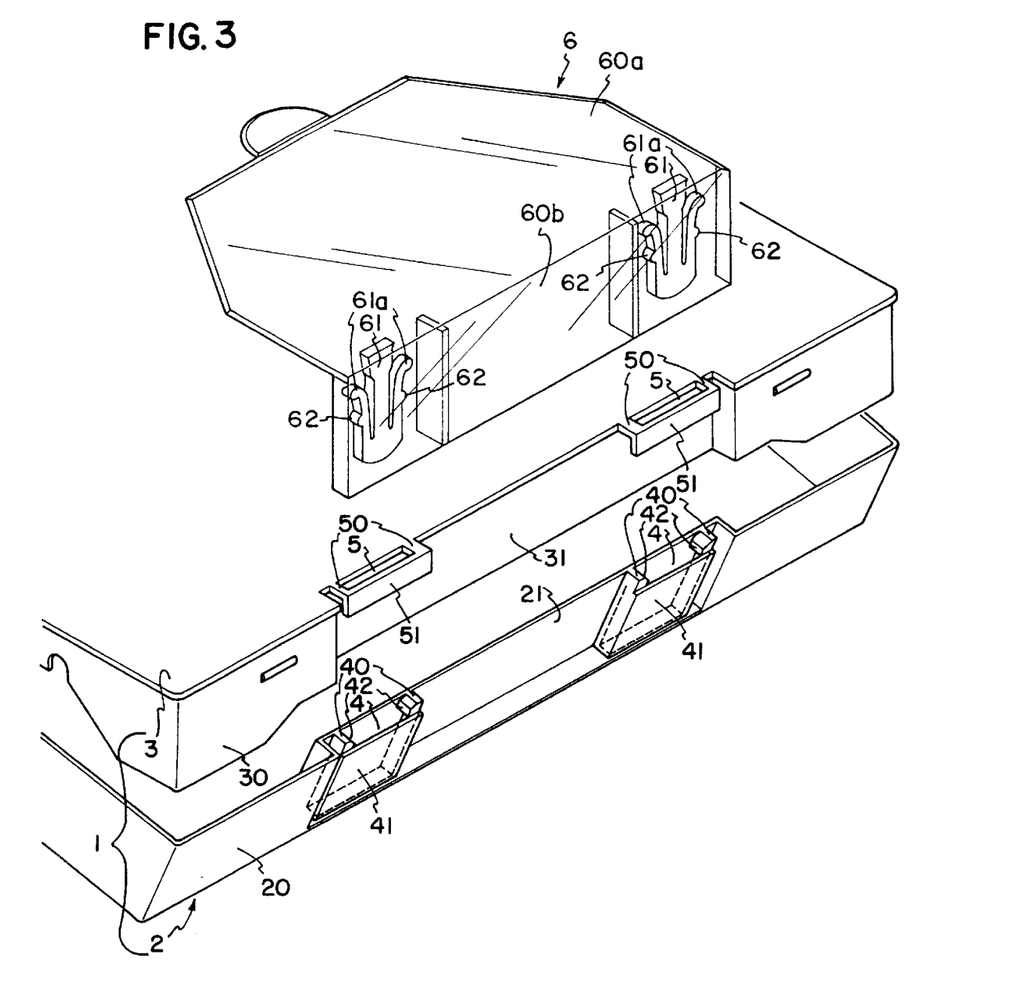
FIG. 3 is a perspective view of the essential points of the case body before the lock is attached.

As FIG. 3 shows, at the center of the longer side of the upright wall 20, there is an indented part 21. Penetration holes 4, 4 are created at this indented part 21. A narrow rectangular piece 40 and a wide rectangular piece 41 are used to make the penetration hole 4. The narrow rectangular piece 40 has the same height as the indented part's depth. The wide rectangle piece's 41 height is shorter than the height of the upright wall 20. At each end of the narrow rectangle piece 40 where the wide rectangle piece yields a space, holding claws 42, 42 are created.

Figure 8:
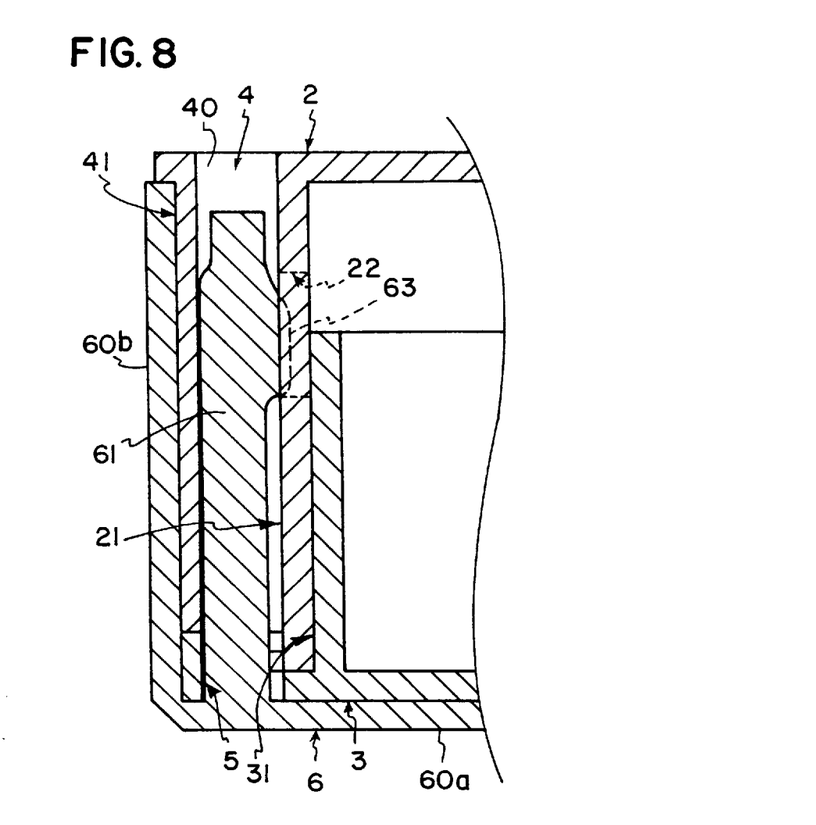
FIG. 8 is a sectional view which presents the connecting of the hole on the left storage part circumference wall and the projection of the lock's hanging stopper.

As FIG. 1 and FIG. 8 show, there are two holes 22, 22 inside of the hole 4 and on the wall of the dent part 21.

Referring back to FIG. 3, at the longer side of the upright wall 30, there is an indented part 31. There are also two penetration holes 5. The penetration holes 5 are created by extended pieces 50, 50 that project from the lid part 3 and a bridge part 51 at the tip of the extended pieces 50, 50. The width of the bridge part 51 is matched with the length difference between the narrow rectangle piece 40 and the wide rectangle piece 41.

Figure 4:
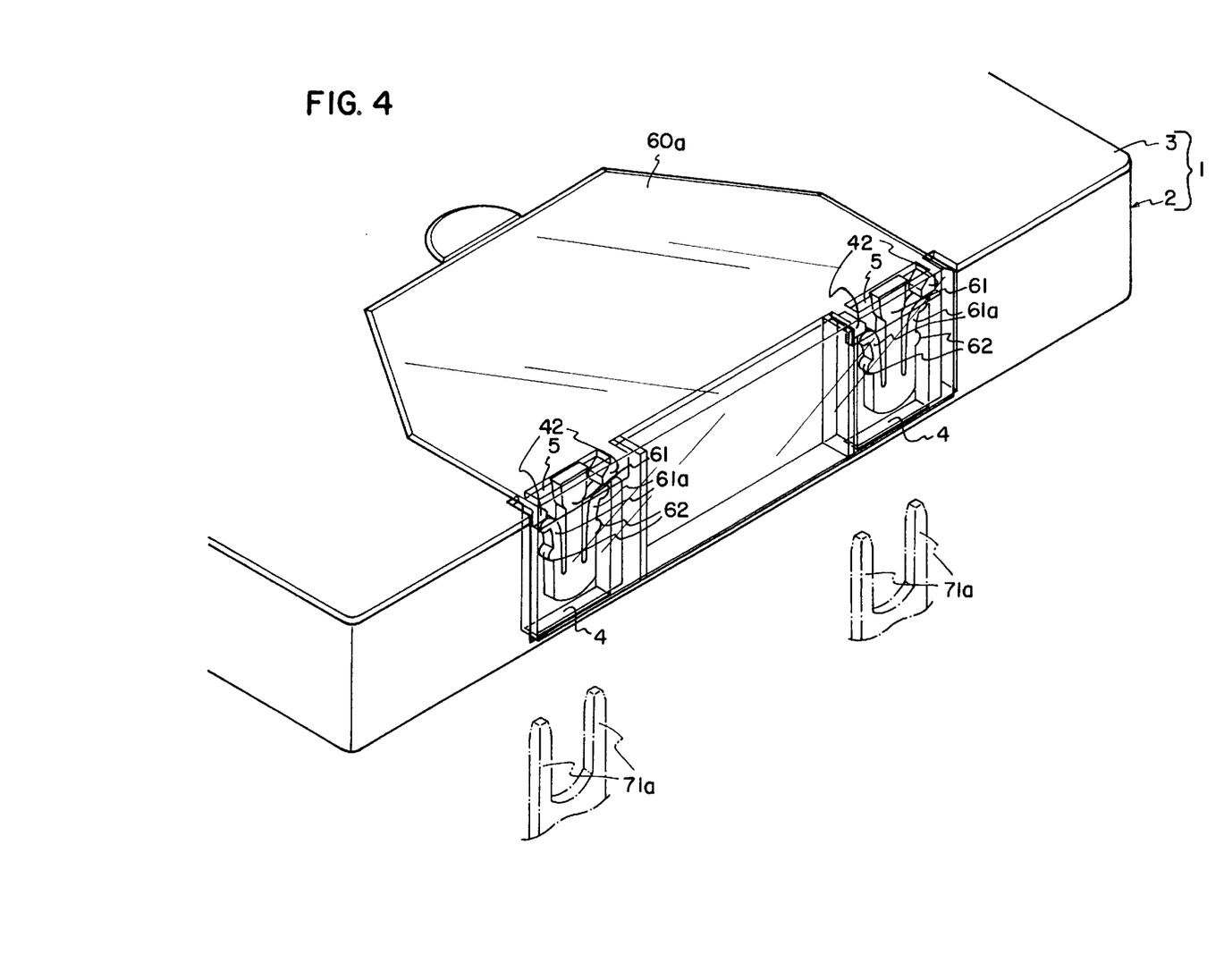
FIG. 4 is a perspective view of the essential points of the case body after the lock is attached.

Referring to FIG. 4, when the case body I is closed, the penetration hole 4 on the receiving body 2 and the penetration hole 5 on the lid part 3 overlap. With the penetration holes 4 and 5, a path is created for a stud 61 of the lock 6 and flexible holding parts 61a, 61a of the lock 6. Moreover, as FIG. 3 shows, the upright wall 30 of the lid part 3 is designed to be higher at the corners and near-by area where the longer side and the shorter sides of the upright wall 30 meet. This design prevents the case body 1 from being forced open at these corners when the lock 6 is set.

Constitution of the lock

As FIG. 3 shows, the lock 6 is structured with an abutting/abutment wall 60a, a cover wall 60b, and the stud 61, 61 with the flexible holding parts 61a, 61a. The cover wall 60b is vertically aligned with respect to the abutting wall 60a. The distance between the tips of the flexible holding parts 61a, 61a is slightly wider than the distance between the holding claw 42, 42. Moreover, there is a projection 62 in the middle of each of the flexible holding parts 61a, 61a.

Referring to FIG. 1 and FIG. 8, the stud 61 has projections 63, 63 configured to stay in holes 22 when the lock 6 is attached to the case body 1. Then, referring to FIG. 6, the holding part 61a and the holding claw 42 create the vertical space. This is because when a detach key body 71 is inserted into the penetration hole 4, the holding claw 42 does not prevent a shaft 71a from changing the shape of the holding part 61a.

Constitution of the detach key

Figure 5:
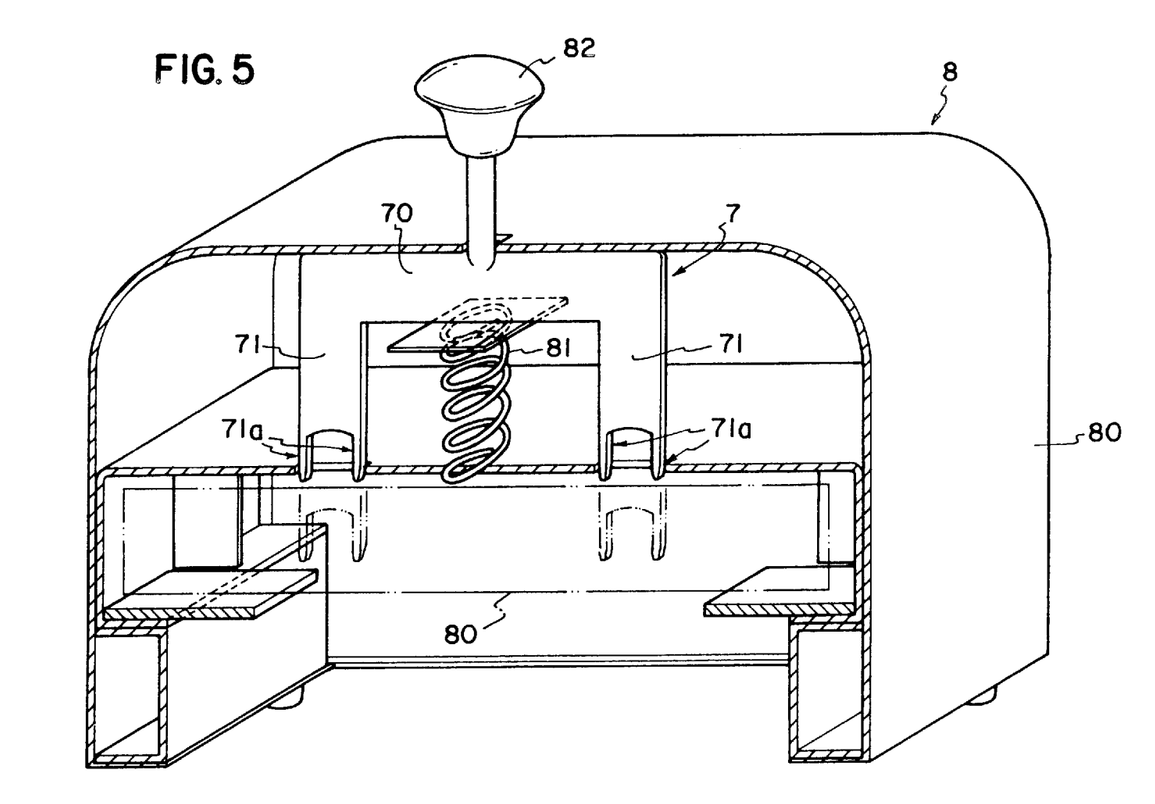
FIG. 5 is a perspective view of a device having a detach key adapted to release the lock from the case body.

As FIG. 5 shows, the detach key 7 is set up on an unlocking device 8. The unlocking device 8 is structured by: (a) a frame 80 with an open space 80a to hold the video tape storage case; and (b) a pushing part 82 to push down the detach key 7 against a spring 81. FIG. 5 also indicates that the detach key 7 is the combination of a pair of detach key bodies 71, 71 and a bridge part 70. At the end of the detach key bodies 71, 71, there are the shafts 71a, 71a adapted to change the shape of the flexible holding parts 61a, 61a when inserted through the penetration hole 4.

Operation-Locking

1. First, the case body 1 is closed. At this stage, the penetration holes 4 and 5 are overlapped and create the path to insert the hanging stopper/stud 61 and the holding parts 61a, 61a of the lock 6.
2. Next, the hanging stopper/stud 61 and the flexible holding parts 61a, 61a are inserted through the penetration hole 5 of the right storage or lid part 3 until the abutting wall 60a touches the surface of the right storage part 3. In this process, the tip of the flexible holding parts 61a, 61a are squeezed by the holding claws 42, 42. After passing the holding claws, the flexible holding parts 61a, 61a resume their shapes. As FIG. 4 and FIG. 6 indicate, the right storage part 3 is attached to the left storage or receiving body part 2 by the lock 6 with the abutting wall 60a. In other words, the case body 1 is locked.

Operation-Unlocking

Figure 6:
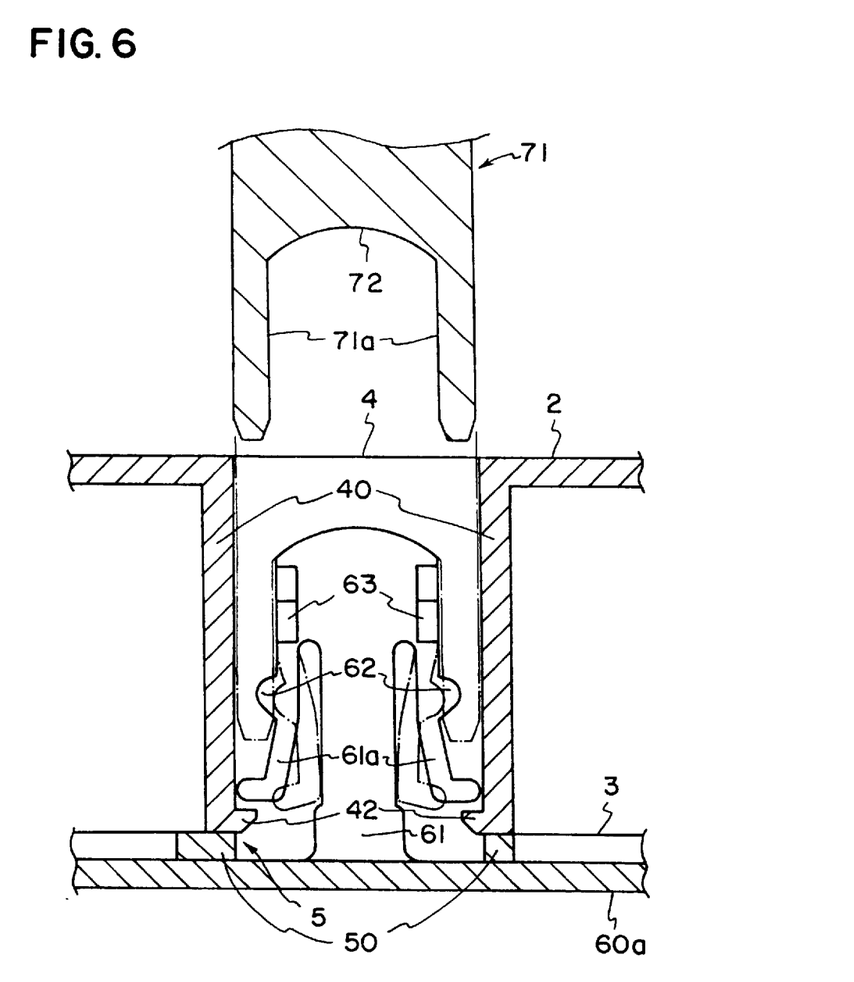
FIG. 6 is a sectional view which shows a relationship between the holding claw of the case body, the holding part of the lock, and the detach key body of the detach key.
Figure 7:
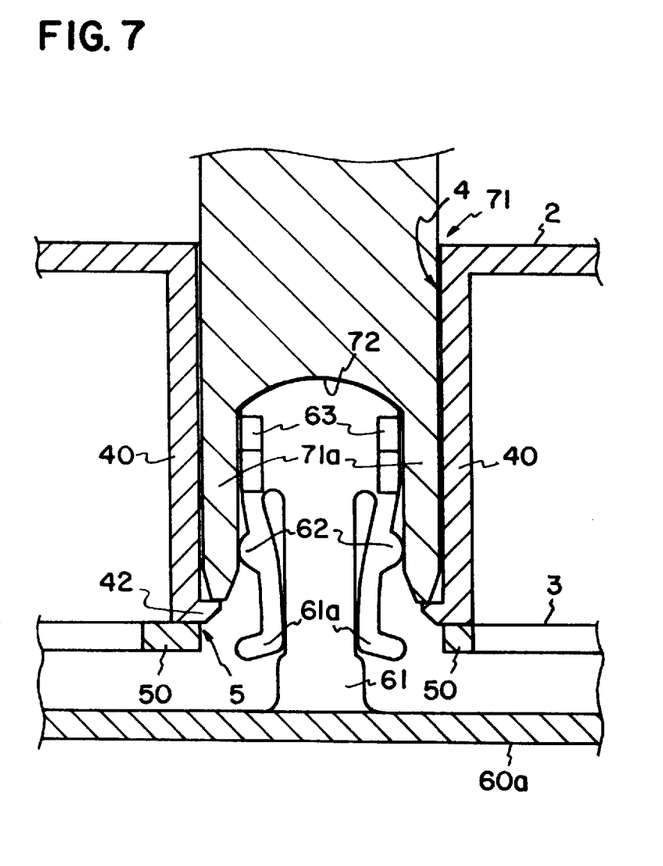
FIG. 7 is a sectional view which indicates the holding part and the hanging stopper pushed out from the penetration hole by releasing the holding part from holding claw with the detach key

1. The video tape storage case is first inserted into the open space 80a of the device 8 with the abutting wall 60a facing down. Referring FIG. 6, each detach key body 71 is placed above the penetration hole 4 of the video tape storage case.
2. Next, the pushing part 82 is pushed down. As indicated at FIG. 6, the detach key body 71 goes down, and the shaft 71a changes the shape of the flexible holding parts 61a, 61a by pushing the projection 62. At this time, the width between the flexible holding parts 61a, 61a, is smaller than the distance between the holding claws 42, 42 and, a plane 72 of the detach key body 71 touches the top of stud 61 of the lock 6.
3. As one can see in FIG. 7, the pushing part 82 is pushed down until the bottom of the shaft 71a reaches the holding claw 42. The abutting wall 60a of the lock 6 is then detached from the right storage part 3 by passing the holding claws 42, 42 while the flexible holding parts 61a, 61a remain the condition of the step 2.
4. The pushing part 82 is then released. When the pushing part 82 is released, the detach key body 71 comes out from the penetration hole 4 and disconnects from the flexible holding parts 61a, 61a and the holding claws 42, 42. As FIG. 7 indicates, the flexible holding parts 61a, 61a return to their normal shape when the shafts 71a, 71a are retracted from the holes 4.
5. The video tape storage case is then pulled from the open space 80a of the device 8.
6. Finally, the lock 6 is removed from the case body 1 such that the case body 1 an be opened.

Other opening operations

Figure 9:
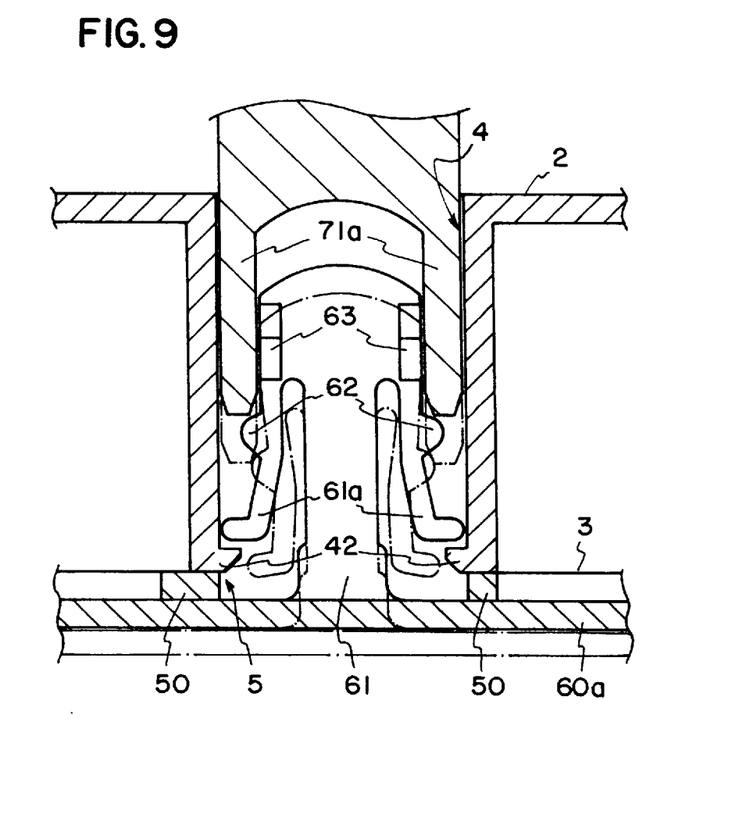
FIG. 9 is a sectional view which indicates the relationship between the holding claw of the case body, the flexible holding parts of the lock, and the detach key body of the detach key for the other type of the video tape storage case.
Figure 10:
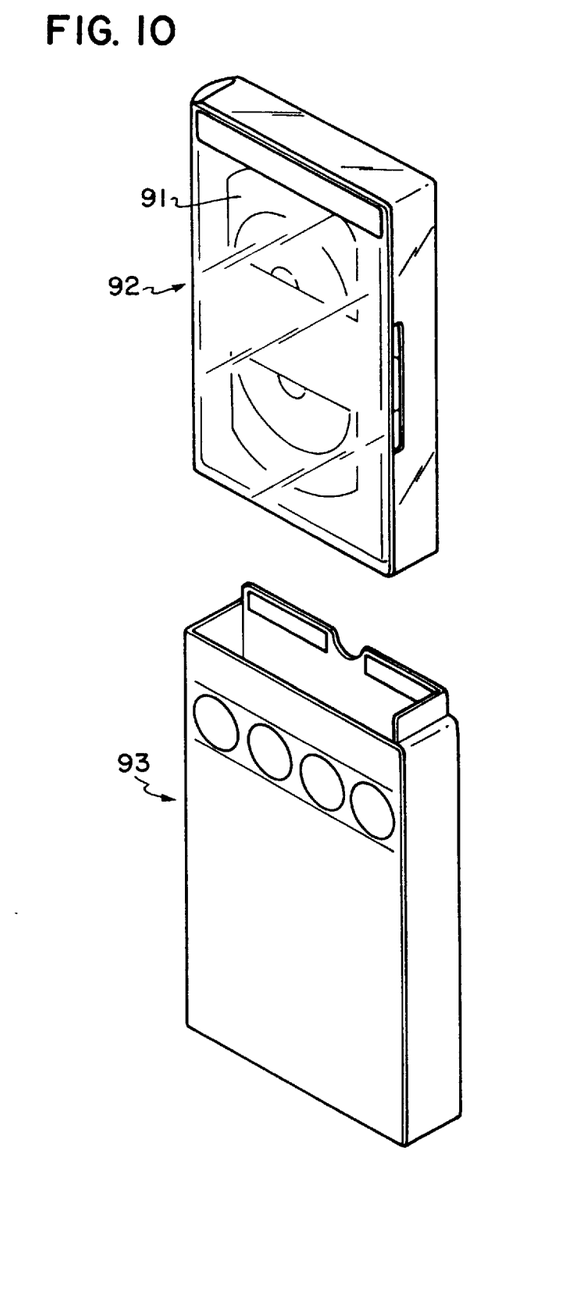
FIG. 10 is a perspective view of the customary technique video tape storage case and the outer case.

As stated above, the stud 61 and the holding part 61a are pushed through the penetration holes 4 and 5. The plane 72 of the detach key body 71 pushes the end of the stud 61 of the lock 6. However, referring to FIG. 9, the shaft 71a of the detach key body 71 can pressure the projection 62 of the lock instead. This process can push the stud 61 and the holding part 61a out form the penetration holes 4 and 5 as well.

I claim:

1. A video tape case with lock comprising:
   a case body structure including a lid part flexibly attached to a receiving body, penetration holes in said receiving body and lid part which are located and configured to overlap when said receiving body and said lid part are closed together;
   a pair of holding claws being located at an end of the penetration hole of said receiving body;
   a lock including an abutment wall and a transformable molding part, said holding part having a stud adapted to be received in said penetration holes;
   said holding claw and said holding part being adapted to fasten together upon insertion of the stud into said penetration holes when the case body is closed, said abutment wall being adapted to touch an outer side of the lid part when said holding claw and holding part are fastened, so that while the case body and the lock are fastened, the case body is unable to be opened; and
   said holding part being adapted to change shape by a detaching key being inserted into the penetration hole of the receiving body, so that the holding part is released from the holding claw to permit the case body to be opened.

2. A video tape case with lock according to claim 1, wherein the case body includes walls, said penetration holes being located in said walls.

3. The video tape case with lock according to claim 1, wherein said lock is made of flexible synthetic resin.

4. A security case comprising:
   a case body structure including a first part interconnected with a second part, the first and second parts being movable between an open position in which an object can be inserted in or removed from the case body structure, and a closed position in which an object can be enclosed within the case body structure, the first and second parts respectively defining first and second penetration holes that are arranged and configured to align when the first and second parts are in the closed position;
   a lock member for locking the first and second parts in the closed position, the lock member including a first portion adapted to be inserted within the first and second penetration openings when the first and second parts are in the closed position, the lock member also including a second portion including an abutment surface arranged and configured to overlap an outer side portion of the first part when the first portion of the locking member is disposed within the first and second penetration holes; and
   a locking arrangement for fastening the first portion of the locking member within the first and second penetration holes, the locking arrangement including a flexible first holding part and a second holding part, the first and second holding parts being arranged and configured to fasten together when the first portion of the locking member is inserted through the first and second penetration holes.

5. The security case of claim 4, wherein the first part of the case body structure comprises a lid, and the second part of the case body structure comprises a receiving body flexibly connected to the lid.

6. The security case of claim 4, wherein the first portion of the lock member comprises a stud, the flexible first holding part being disposed on the stud, and the second holding part being disposed within the second penetration hole.

7. The security case of claim 6, wherein the second holding part comprises a holding claw.

8. The security case of claim 6, wherein the second holding part comprises a projection extending into the second penetration hole.

9. The security case of claim 6, wherein the flexible first holding part comprises a pair of flexible lever arms.

10. The security case of claim 4, wherein the flexible first holding part is adapted to change shape by a detaching key being inserted into the second penetration hole such that the flexible first holding part is released from the second holding part to permit the case body structure to be opened.

11. The security case of claim 4, wherein the case body structure is sized and shaped for holding a video tape.

12. A security case system comprising:

a case body structure including a first part interconnected with a second part, the first and second parts being movable between an open position in which an object can be inserted in or removed from the case body structure, and a closed position in which an object can be enclosed within the case body structure, the first and second parts respectively defining first and second penetration holes that are arranged and configured to align when the first and second parts are in the closed position;

a lock member for locking the first and second parts in the closed position, the lock member including a first portion adapted to be inserted within the first and second penetration openings when the first and second parts are in the closed position, the lock member also including a second portion including an abutment surface arranged and configured to overlap an outer side portion of the first part when the first portion of the locking member is disposed within the first and second penetration holes;

a locking arrangement for fastening the first portion of the locking member within the first and second penetration holes, the locking arrangement including a flexible first holding part and a second holding part, the first and second holding parts being arranged and configured to fasten together when the first portion of the locking member is inserted through the first and second penetration holes; and a detaching key for unfastening the flexible first holding part and the second holding part, the flexible first holding part being arranged and configured to flex away and unfasten from the second holding part when the key is inserted into the second penetration hole such that the case body is permitted to be opened.

13. The security case system of claim 12, wherein the detach key is arranged and configured to both unfasten the flexible first holding part from the second holding part, and axially move the first portion of the locking member within the first and second penetration holes.

14. The system of claim 12, wherein the detach key is incorporated within an unlocking device having a chamber for receiving the case body structure and a pushing member for moving the detach key, the case body being opened by inserting the case body structure in the chamber and moving the pushing member in a single stroke, wherein as the pushing member is moved in a single stroke, the detach key is inserted in the second penetration hole causing the flexible first holding part to unfasten from the second holding part and also causing the first portion of the locking member to move axially within the first and second penetration openings.

15. The system of claim 12, wherein the flexible first holding part is disposed on the first portion of the locking member and the second holding part is disposed within the second penetration hole.

16. The system of claim 15, wherein the flexible first holding part includes a pair of flexible arms and the second holding part comprises a holding claw located within the second penetration hole.

17. The system of claim 16, wherein the detach key includes two spaced apart detach key bodies arranged and configured to flex the flexible arms away from the holding claw when the detach key is inserted in the second penetration hole.

18. The system of claim 17, wherein the detach key includes a bridge portion extending between the spaced apart detach key bodies, the bridge portion being adapted to axially move the first portion of the locking member axially within the first and second penetration holes after the flexible arms have been flexed away from the holding claw via the two spaced apart detach key bodies.

* * * * *

UNITED STATES PATENT AND TRADEMARK OFFICE
CERTIFICATE OF CORRECTION

PATENT NO.  : 5,823,341
DATED       : October 20, 1998
INVENTOR(S) : Tamotsu Nakasuji It is certified that error appears in the above-identified patent and that said Letters Patent is hereby corrected as shown below:

On the title page, insert item [30] Foreign Application Priority Data

November 10, 1995  [JP]  Japan..........................7-292256

Signed and Sealed this

Ninth Day of March, 1999

Attest:

Q. TODD DICKINSON

Attesting Officer

Acting Commissioner of Patents and Trademarks